Jan. 2, 1968  H. V. SEARS  3,361,219
DOWN-HOLE DRILL
Filed Sept. 15, 1965
3 Sheets-Sheet 1
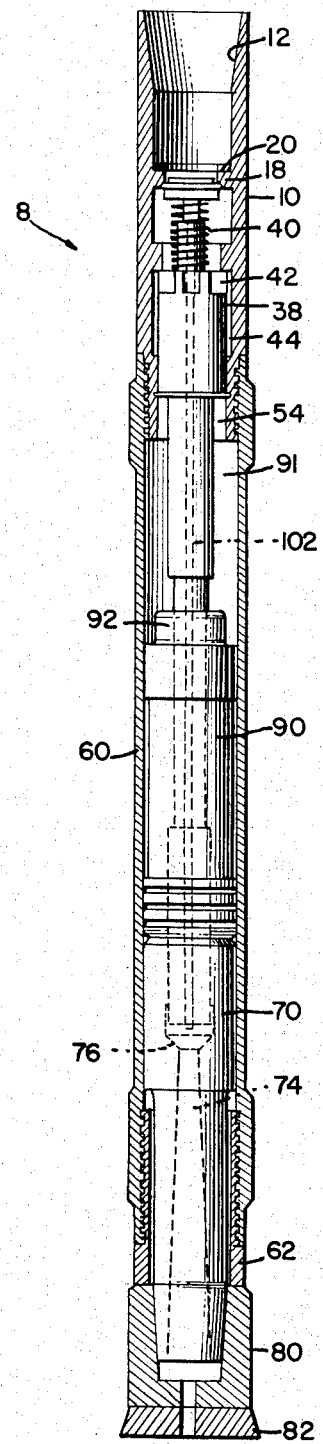
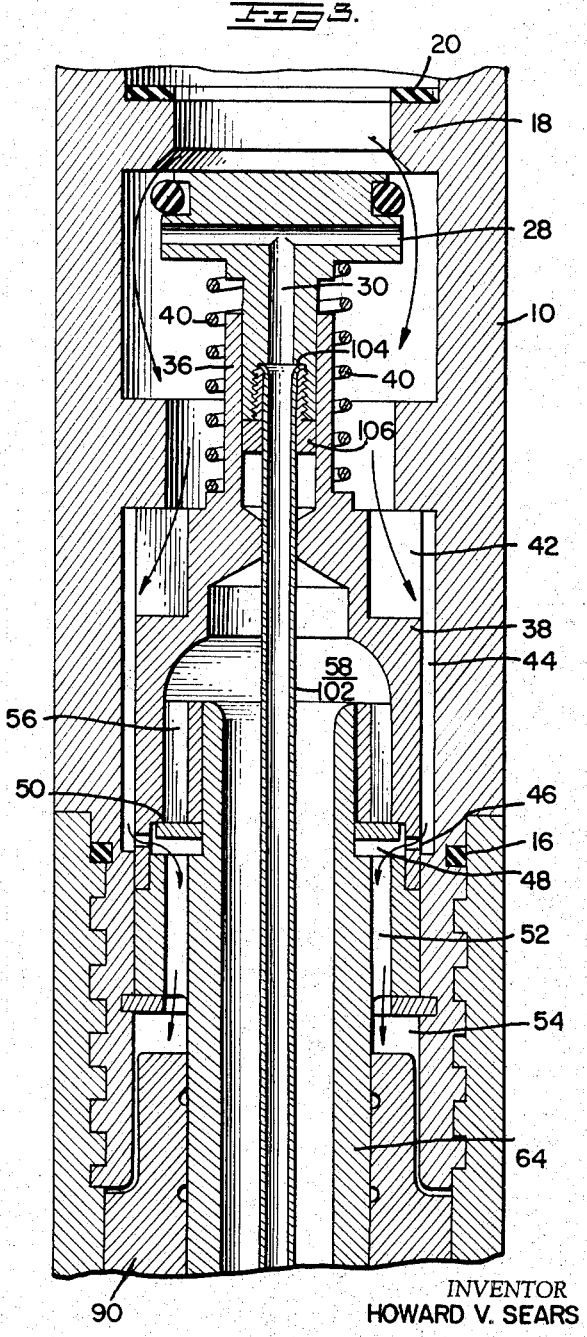
INVENTOR
HOWARD V. SEARS
BY *Stowell & Stowell*
ATTORNEYS

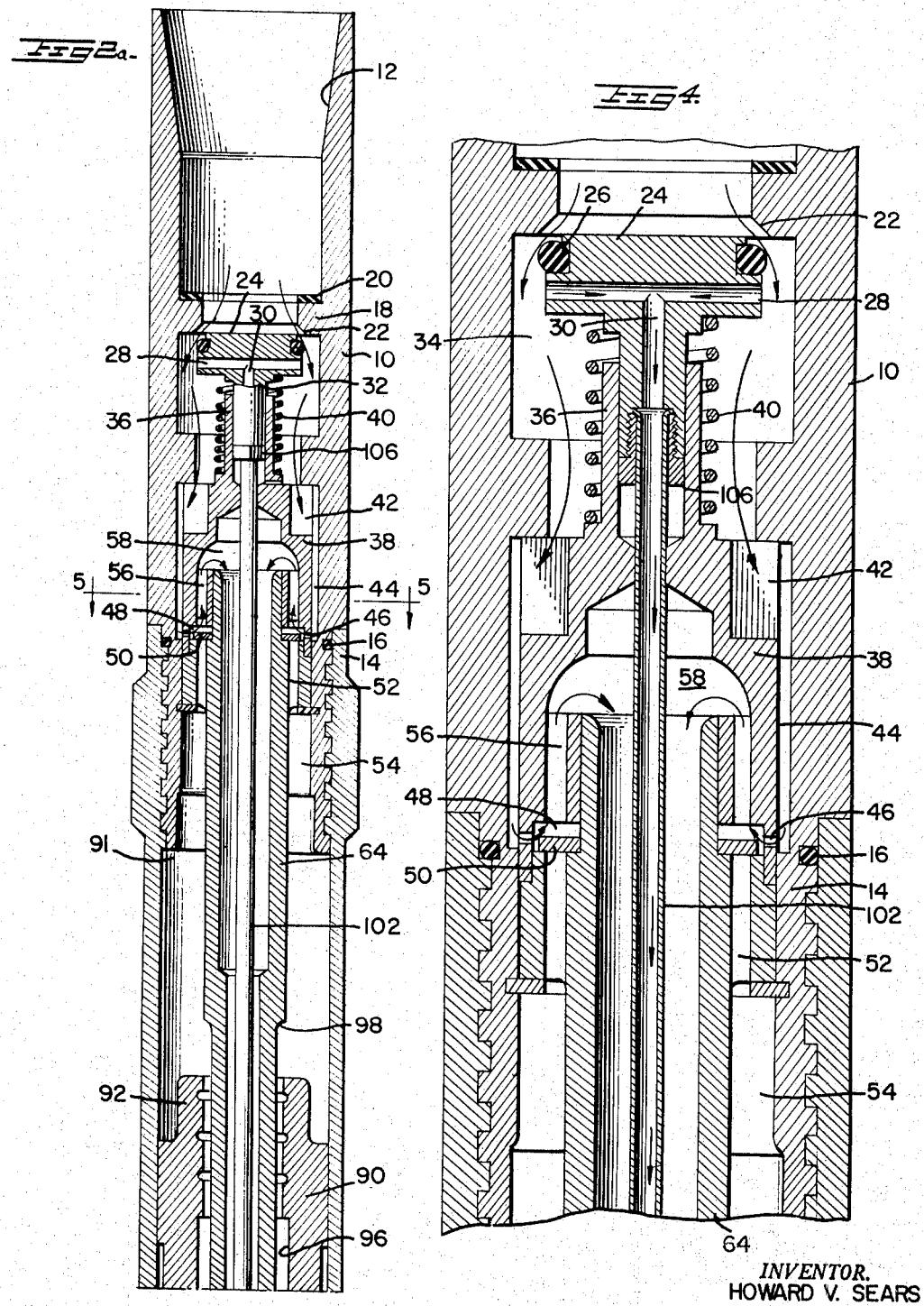

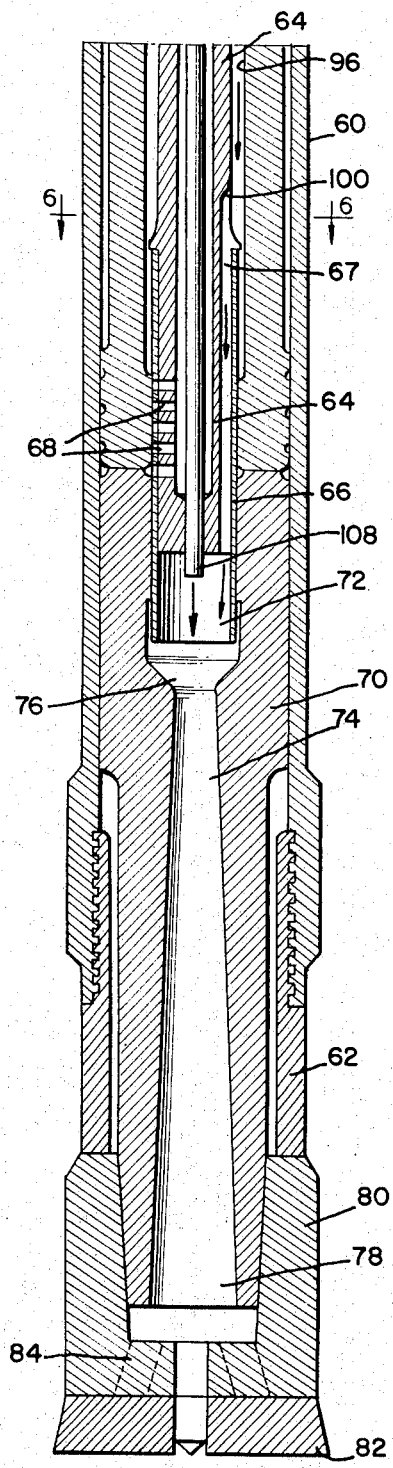
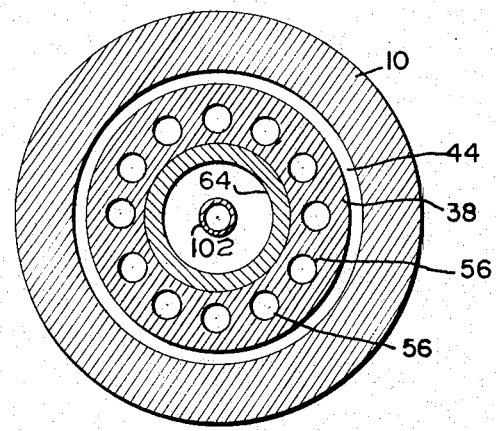
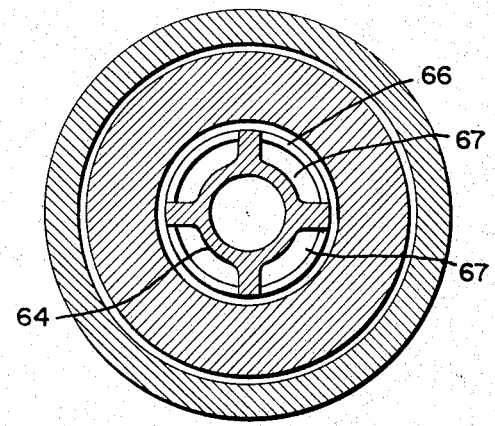

United States Patent Office 3,361,219
Patented Jan. 2, 1968

3,361,219
DOWN-HOLE DRILL
Howard V. Sears, Flat River, Mo., assignor to St. Joseph Lead Company, New York, N.Y., a corporation of New York
Filed Sept. 15, 1965, Ser. No. 487,455
6 Claims. (Cl. 173—64)

ABSTRACT OF THE DISCLOSURE

A down-hole drill is provided at its lower portion with a divergent nozzle. The wider portion of the divergent nozzle communicates with holes leading to the exterior of a bit carried by the drill. A portion of the motive fluid passes through a tube directly through the drill to the narrow portion of the divergent nozzle. The exhaust from the fluid motor also passes to the narrow portion of the divergent nozzle.

---

This invention relates to a pressure fluid operated drill of the percussion type of the kind adapted to drill a hole in the earth, percussive forces generated within the drill being transmitted directly to the drill bit. More particularly, the invention relates to a type of drill known as a down-hole drill in which the drill follows its bit down into the hole being drilled and steel pipe is added behind the drill as the hole is drilled deeper. The drill pipe connects the drill to a surface drilling rig which rotates it, thus making a round hole. Drills of this general type are known and one such drill is shown in U.S. Patent 3,084,673.

The mode of operation which is representative of a great number of presently employed down-hole drills is as follows. A compressible fluid, such as air, is introduced into the drill as it is being rotated by a surface rig, the fluid passing through a fluid operated motor positioned within the drill itself. The fluid operated motor is, in its simplest terms, a piston which functions to impart a downward force on the drill which is transferred to the drill bit, with the piston further acting as a valve which, in cooperation with other valve elements in the drill, functions to continuously oscillate the piston up and down to provide an intermittent downward force urging the drill bit into the earth. The exhaust of such drills is often led to apertures in the bottom portion which communicate with apertures in the drill bit itself and the exhausted fluid performs the further function of cleaning the area directly contacted by the drill bit to thereby facilitate removal from the direct path of the cutting edges of the bit any particles which would naturally form or which would naturally be displaced by the cutting portions of the bit.

With this brief explanation, the reader will appreciate that the lower the exhaust pressure of the fluid motor within the drill, the greater will be the efficiency of the drill. This is analogous to the situation encountered in any cylinder and piston type of motor, and is easily comprehended since fluid acts on one side of the piston and any fluid (the exhaust pressure) which is on the other side of the piston gives rise to a counterpressure acting against the main, or driving pressure.

In a down-hole drilling operation, as the hole deepens more pressure is needed to sweep the cuttings out of the hole, to overcome the friction of the annular exhaust fluid passage between the drill rod and the wall of the hole within the earth, and also to eject any water seeping in from the earth which might flow into the hole which is drilled. In many conventional down-hole drills, such increased pressure can only be obtained from the fluid motor exhaust pressure, since the exhaust pressure is the pressure which is available to fulfill the above-mentioned three functions with hole deepening. But, as set forth above, an increase in exhaust pressure in a cylinder and piston arrangement is undesirable, such an exhaust pressure representing a counterforce acting against the power stroke of the piston.

According to the practice of the present invention, a novel configuration is given to a portion of the down-hole drill of this invention, which will simultaneously enable the realization of greater pressures available at the drill bit to perform the three above enumerated functions, without the expected and conventional arising of greater exhaust pressures adjacent the moving piston which diminishes its hitting force on the drill to drive it downwardly into the earth. This novel configuration is in the form of a tapered aperture, which, because of its shape, may be termed a Venturi tube or throat, in combination with what may be termed a jet tube extending within and longitudinally of the down-hole drill with the end of the jet tube being adjacent the narrowest portion of the Venturi tube.

In the drawings:

FIGURE 1 is a partial longitudinal cross-section of the down-hole drill of this invention.

FIGURES 2a and 2b are enlarged views, similar to FIGURE 1, of the upper and lower portions of the drill.

FIGURE 3 is an enlarged view, of a portion of FIGURE 2a, of the drill when its driving piston is in the upper portion of the drill.

FIGURE 4, similar to FIGURE 3, shows the position of a valve element on downward motion of the driving piston.

FIGURE 5 is a view taken along line 5—5 of FIGURE 2a.

FIGURE 6 is a view taken along line 6—6 of FIGURE 2b.

Referring now to FIGURES 1, 2a, 2b, 3 and 4 of the drawings, the numeral 8 denotes, generally, the down-hole drill of this invention and includes an upper cylindrical member 10, termed a backhead, provided at its upper portion with a tapered portion 12 which may be threaded to receive complementary external threads in the lowermost portion of steel pipe rotated by a surface drilling rig. The lower portion of backhead 10 is provided with a plurality of external threads 14 and a sealing member 16 around an upper peripheral portion thereof. A reduced neck portion or shoulder 18 is formed within the bore of backhead 10, the upper surface of which may be provided with a sealing gasket 20. The lower portion of shoulder 18 is somewhat rounded as indicated at 22 to form a seat for a valve portion 24 carrying a gasket element 26 therearound. Portion 24 is provided with a plurality of radially extending apertures 28 communicating with a central aperture 30 within neck portion 32. The neck is positioned within a chamber 34 of backhead 10, with the neck 32 being slidable within tube 36.

The numeral 38 denotes a valve component portion integral with tube 36 and is positioned within upper portion of backhead 10. A coil spring 40, normally in compression, extends between abutment portions on relatively movable valve elements 24 and 38. This spring normally urges valve portion 24 upwardly so that its gasket 26 hydraulically seals chamber 34 from the upper recess in backhead 10. Fluid (air) pressure from a steel pipe coupled to backhead 10 will act against the top of valve portion 24 to urge it downwardly, to thereby establish fluid communication between the fluid input and chamber 34.

The numeral 42 denotes a cut-away in valve portion 38 which communicates with a circumferentially extending recess 44 between the outside of valve portion 38 and the adjacent internal surface of backhead 10.

The numeral 46 denotes one of a plurality of angularly spaced ports positioned in the lower part of valve portion 38 and provides fluid communication between recess 44 and annular chamber 48.

A reciprocating annularly shaped valve ring 50 in its lowermost position seals the upper openings of angularly spaced passageways 52, the latter providing fluid communication between chamber 48 and chamber 54. In its upper limit of travel, valve 50 seals off the bottom portions of passageways 56 which are angularly arranged with respect to the longitudinal axis of the down-hole drill, the upper ends of passageways 56 communicating with chamber 58. It will be observed that there is a radial clearance between the portion of greatest diameter of valve ring 50 and that portion of valve element 38 immediately adjacent ports 46. This permits any fluid passing from chamber 34 through recess 44 to exit through ports 46 to either passageways 52 or passageways 56.

The numeral 60 denotes an intermediate barrel or tubular portion of the down-hole drill and is internally threaded at its upper portion to receive the external threads of backhead 10 and is also internally threaded at its lower portion to receive the external threads of a tubular chuck 62. An internal barrel element 64 extends from its upper portion, within valve element 38, downwardly where it is surrounded at its lower portion by a sleeve 66 having ports 68 between the internal and external surfaces of tube 64. The lower portion of sleeve 66 fits into the upper portion of a diffuser tube 70, the former having an upper chamber portion 72 therein. Tube 70 is provided at its lower portion with a diverging chamber 74 having an upper neck portion 76 and a lower exit portion 78. Because of its configuration and in view of the function which it performs (as will be set forth later), chamber 74 is termed a Venturi tube.

A bit 80 is secured as by wedge fitting to the projecting portion of tube 70. The bit 80 is provided at its lower portion with a plurality of cutting heads 82 and passageways 84 lead from the exit portion 78 of Venturi tube 74 to the external lower face of bit 80.

The numeral 90 denotes a generally cylindrical piston having an upper shoulder projection 92 adapted to fit in complementary recess 54 defined by internal barrel element 64 and the lower portion of backhead 10. A radially enlarged angular recess 96 extends between the ends of the piston on the inner surface thereof. The internal barrel 64 tapers stepwise downwardly, beginning at circumferential sealing shoulder 98. Shoulders 100, each of limited angular extent, are positioned slightly above the top of sleeve 66.

A jet tube 102 has its top portion outwardly swaged as indicated by the numeral 104 and screw thimble 106 receives the upper portion of the jet tube below the swaged portion to hold it in fixed position with valve element 24. The lower end of jet tube 102 extends through the bottom closure of internal barrel 64 and is slightly diminished in cross-sectional area at the very tip, the latter denoted by the numeral 108. Thus, the exit portion of tube 102 is positioned within chamber 72.

The operation of the down-hole drill above described will now be set forth. Assuming a suitable coupling to the upper backhead 10 a suitable pressure fluid, such as air, available from the surface drilling rig, the valve 24 will be pushed downwardly against the action of coil spring 40 to admit the pressure fluid into chamber 34. Assuming the piston 90 to be in its lowermost position initially, there is no above ambient pressure in chamber 91 and valve ring 50 assumes its lowermost position, as shown in detail at FIGURE 4. Air from chamber 34 passes through recess 44 and into ports 46 where, with valve ring 50 in its lowermost position, it passes through passageways 56 to chamber 58. Passing downwardly through chamber 58, the pressure fluid exits through that port 68 contiguous to the junction of the upper anvil portion of diffuser tube 70 and the lowermost surface of piston 90. The reader will observe a small chamfer on the inner edge of this part of piston 90 so as to always admit air between the anvil of diffuser tube 70 and the lowermost portion of piston 90. As the flow of pressure fluid continues, piston 90 is lifted upwardly against the force of gravity until its lower end passes the upper edge of sleeve 66. At this point, the high pressure air is allowed to exhaust through spaces 67 between sleeve 66 and the lower portion of internal barrel 64. From here, it passes into chamber 72 and thence through chamber 74 to the bit 80 and thence through holes 84 to the outside of the drill.

At this point, the inertia of piston 90 carries it further upward, thereby compressing the air in chamber 91 above the piston. As the piston travels further upward, the air in chamber 54 is also compressed and this compression results in the lifting of valve ring 50 from its lowermost seated position to its uppermost position. This causes incoming working fluid from chamber 34 and ports 46 to now pass through passageways 52, where the working fluid acts against the top of piston 90 and against the compressive forces of the gas in the upper portion 54 of chamber 91. This is shown in FIGURE 3. As the piston 90 travels downwardly in its power or impact portion of the cycle, there will be a point where the upper end of the piston passes the sealing shoulder 98. After this point is reached in the downward travel of the piston (see FIGURE 2a), the input fluid is free to exit as before to the outside of the drill. Shortly after the sealing shoulder 98 allows the input fluid to exhaust to the outside of the bit, the pressure within chamber 91 drops, allowing the valve ring 50 to return to its lowermost position.

The piston 90 then strikes the top or anvil portion of diffuser tube 70, imparting a downward thrust or force to it, which is imparted to the drill bit and the hole being drilled in the earth lengthened. After this, the above described process is repeated.

During the time the piston 90 is reciprocating and executing its power and exhaust cycles, pressure fluid flows from chamber 34 to passageways 28, to the interior 30 of neck portion 32, thence to the interior of jet tube 102. The pressure fluid exits from the end 108 of the tube 102 and into mixing chamber 72. Here, the pressure fluid mixes with the exhausted gas which has undergone the above described passage through the fluid motor and the mixture is carried into the entrance throat 76 of Venturi tube 74. By virtue of its greater exit orifice area 78, the tube 74 functions as a Venturi tube. The application of Bernoulli's equation to such a sloping-sided tube shows that the kinetic or velocity energy of the fluid passing through entrance orifice 76 is greater than that passing through exit orifice 78, with a corresponding increase in pressure energy at exit 78 over the pressure energy at input orifice 76.

It will be recalled from the introductory portion of this description that as the hole in the earth deepens, greater pressures are needed at the exterior portion of the drill bit to remove drilled matter, to overcome the friction present when the exhausted air passes upwardly between the walls of the drill and the walls of the hole, and to aid in ejecting any water flowing into the hole. By the use of the Venturi diffuser tube 70 having the shape 74, not only is there a greater pressure available to perform these functions at the very bottom of the drill bit, but the exhaust pressure in chamber 72 is diminished, thereby improving the action of the fluid motor, as discussed in the introductory portion of this specification. Hence, the cooperation between the jet tube 102 and the Venturi tube 74 yields the simultaneous benefits of diminished exhaust pressure for the fluid motor operation aspect of the drilling operation and at the same time increases the pressure energy, or pressure head, available at the very bottom of the drilled hole.

What is claimed is:

1. A down-hole drill including an elongated housing containing a fluid operated motor for producing impact blows internally of the drill to force it downwardly in a hole being drilled in the earth, an exhaust chamber within said drill for said fluid motor, a divergent nozzle, the smaller throat of said nozzle being in communication with said exhaust chamber and the larger throat of said nozzle being in fluid communication with an exterior portion of said drill, means for introducing a jet of air centrally of the smaller throat end of said divergent nozzle, whereby the pressure at the larger throat end of said nozzle is greater than the pressure at the smallest throat end of said nozzle to thereby assist in cleaning cuttings away from the drill, and whereby removal of exhaust air from the fluid motor is facilitated.

2. The down-hole drill of claim 1 including a bit, and wherein said larger throat is in fluid communication with exterior portions of said bit, said bit being carried by said drill, adjacent the cutting edges thereof.

3. A down-hole drill including a fluid operated motor positioned within said drill for producing impact blows, an exhaust chamber for said motor, a closed fluid path from a fluid supply chamber to and terminating within said exhaust chamber, said closed fluid path bypassing said motor, a divergent nozzle, said exhaust chamber being contiguous to and in fluid communication with the smaller throat of said divergent nozzle, and ports from the larger throat of said nozzle to the exterior of said drill.

4. The drill of claim 3 wherein said closed fluid path comprises an elongated tube centrally positioned in said drill and passes through said motor, a valve element, said tube being fixed to said valve element, the said valve element being movable with respect to said drill upon the introduction of pressure fluid to said drill.

5. The drill of claim 1 wherein said motor has a reciprocating piston, a chamber within said drill, a freely movable valve ring, said chamber communicating with the bottom portion of said valve ring within said drill, the position of said valve ring controlling input of working fluid to said drill.

6. The drill of claim 3 wherein said motor has a reciprocating piston, a chamber within said drill, a freely movable valve ring, said chamber communicating with the bottom portion of said valve ring within said drill, the position of said valve ring controlling input of working fluid to said drill.

References Cited

UNITED STATES PATENTS

| | | | |
|---|---|---|---|
| 1,157,605 | 10/1915 | Waugh | 173—73 X |
| 1,709,024 | 4/1929 | Katterjohn | 173—134 X |
| 2,081,918 | 6/1937 | Gartin | 173—134 X |
| 3,059,619 | 10/1962 | Beaumont | 173—64 |
| 3,187,823 | 6/1965 | Cleary | 173—73 X |
| 3,195,657 | 7/1965 | Collier | 173—73 X |

FRED C. MATTERN, Jr., *Primary Examiner.*

L. P. KESSLER, *Assistant Examiner.*